United States Patent [19]

Robertson et al.

[11] 4,188,236

[45] Feb. 12, 1980

[54] PROCESS FOR THE PRODUCTION OF A PIGMENT COMPOSITION

[75] Inventors: George H. Robertson, Cincinnati, Ohio; Alistair B. Boyd, Paisley; Robert L. Rooney, Beith, both of Scotland

[73] Assignee: Ciba-Geigy Corporation, Ardsley, N.Y.

[21] Appl. No.: 959,267

[22] Filed: Nov. 9, 1978

[30] Foreign Application Priority Data

Nov. 18, 1977 [GB] United Kingdom ............... 48061/77

[51] Int. Cl.$^2$ ................................................ C08J 3/12
[52] U.S. Cl. .................................. 106/308 Q; 106/309
[58] Field of Search ............... 106/308 Q, 308 M, 309

[56] References Cited

U.S. PATENT DOCUMENTS 4,015,999  4/1977  Robertson et al. .................. 106/309
4,116,924  9/1978  Peabody .......................... 106/308 Q Primary Examiner—James Poer
Attorney, Agent, or Firm—Joseph F. DiPrima

[57] ABSTRACT

A process for the production of a non-dusting pigment composition by contacting an aqueous dispersion of an organic pigment with (a) a solution or dispersion of an alkaline soluble rosin acid derivative
(b) a sorbitan ester, and
(c) a water-insoluble organic carrier having a melting point below 100° C. at a temperature above the melting point of both the sorbitan ester and the organic carrier, reducing the pH to below $\epsilon$, stirring the composition until the pigment, rosin derivative, sorbitan ester and organic carrier are associated in generally spherical granules and recovering the resulting granules.

9 Claims, No Drawings

PROCESS FOR THE PRODUCTION OF A PIGMENT COMPOSITION

The present invention relates to a process for the production of a pigment composition in a non-dusting form.

The U.S. Pat. No. 4,015,999 describes a pigment composition in the form of free-flowing, non-dusting, non-aggregating, non-sticky generally spherical beads which comprise from 40 to 80% by weight of a pigment or a water insoluble dyestuff, from 5 to 40% by weight of a water-insoluble organic carrier or mixture of carriers melting below 100° C., from 2.5 to 25% by weight of an organic acid and from 1.5 to 25% by weight of an organic base, the amount of acid plus base being from 5 to 35% by weight, all percentages being based on the weight of the total composition.

These compositions are made by a process which comprises contacting with agitation an aqueous dispersion of a pigment or water-insoluble dyestuff with a water-insoluble organic carrier melting below 100° C. at a temperature at which the organic carrier is molten, in the presence of an aqueous protective colloid and a mixture of an organic acid and an organic base rendered insoluble by making the pH of the mixture substantially neutral, and allowing the aqueous phase to become substantially free of pigment or water-insoluble dyestuff by its association with the organic carrier, and recovering the resulting pigmented beads, after cooling if necessary.

The acid compounds which can be used in the process of the said U.S. Pat. No. 4,015,999 include the resin acids and derivatives thereof. In many instances the use of pigment compositions containing rosin acids is desirable, but the presence of organic bases, particularly fatty amines, is not desirable. Such uses include pigmenting PVC products, which come into contact with foodstuffs. Also the presence of fatty amines has a detrimental effect on the electrical properties of plastic films.

We have now found that if a sorbitan ester is used in place of the organic base, a high yield of beads are produced which have very good dispersibility in plastics such as PVC. Moreover, it is no longer necessary to use a protective colloid, although one can be used if desired.

Accordingly, the present invention provides a process for the production of a pigment composition in a non-dusting form which comprises contacting an aqueous dispersion of an organic pigment with (a) a solution or dispersion of an alkaline soluble rosin acid derivative having an approximate acid value in the range 100–250, at a pH of from 8 to 11.

(b) a sorbitan ester, and (c) a water-insoluble organic carrier having a melting point below 100° C.

at a temperature above the melting point of both the sorbitan ester and the organic carrier, reducing the pH to below 8, stirring the composition until the pigment, rosin derivative, sorbitan ester and organic carrier are associated in generally spherical granules, and recovering the resulting granules, the amounts of the ingredients being 40–75% pigment, 5–25% rosin acid, 5–40% sorbitan ester and 5–50% carrier, all percentages being based on the weight of the total composition.

Suitable rosin acid derivatives are based on wood rosin or its hydrogenated derivative or disproportionated rosin; modified rosins such as phenolic, maleic or maleic ester condensates are also suitable. These compounds are soluble in water as their alkali metal or ammonium salts or as salts with volatile amines.

Preferred alkali metals are lithium, sodium and potassium and a preferred volatile amine is morpholine. If an ammonium or volatile-amine salt is used, the ammonia or volatile amine is removed from the composition during the heating process, neutralisation and washing procedures.

Suitable sorbitan esters include those derived from fatty acids having 12 to 22 carbon atoms. The ester may be a mono-, di or tri- ester. Preferred esters are the mono-, di and tri-laurate, -oleate and -stearate.

The organic carrier may be a single compound or it can be a mixture of compounds which give a mixed melting point below 100° C., preferably in the range of 40° to 100° C. It is not necessary for the mixture of compounds to have a sharp melting point which, of course, a single compound would have, but it may melt over a range of a few degrees, e.g. over 15–20 centigrade degrees.

The choice of organic carrier will largely be governed by the needs of the system in which the granules are to be used to ensure adequate solubility in and compatibility with the solvent and resin or polymer respectively. Examples of suitable water-insoluble organic carriers include fatty alcohols, such as cetyl alcohol and stearyl alcohol; carboxylic acids such as stearic acid, behenic acid, N-dodecyl phthalamic acid, N-octyl phthalamic acid and N-stearyl phthalamic acid; fatty esters such as cetyl palmitate; fatty amides such as oleamide and palmitamide; fatty esters of polyols such as hardened castor oil; benzoic acid esters of polyols; phthalate esters such as dicyclohexyl phthalate; alkylimides such as N-dodecyl phthalimide and N-octyl phthalimide; and alkyl hydantoins such as 3-stearyl-5,5-dimethyl hydantoin and 1-hydroxy-ethyl-e-stearyl-5,5-dimethyl hydantoin.

In addition to using single compounds, mixtures of compounds may be used, such as mixtures of those specified above and mixtures containing compounds which may melt above 100° C., but give rise to mixtures which melt below 100° C., e.g. a mixture with cholesterol and magnesium behenate. Resinous materials which soften to give highly immobile liquids cannot satisfactorily be used alone. However, these compounds can be used in mixtures with the above organic carriers, especially the fatty amides and fatty alcohols. Such resinous materials which may soften above or below 100° C. are typified by the following compounds—hydrocarbon resins such as Hercures A.80, A.100, A.130 and A.150 (Hercures is a Trade Mark), zinc rosinate and rosin esters.

If desired, an aqueous protective colloid may be added to the mixture to provide more uniform granule size distribution. If used, it may be added in such an amount as will form a solution of 0.1 to 5% w/w, but preferably 0.5 to 2% w/w based on the amount of pigment plus organic carrier. Suitable protective colloids include, for example, cellulose derivatives such as hydroxyethyl cellulose and hydroxypropyl cellulose, polyvinyl alcohol, polyethylene oxide, polypropylene oxide, copolymers of ethylene oxide and propylene oxide, adducts of ethylene oxide or propylene oxide, vinyl pyrrolidone homo or copolymers or mixtures of these compounds. The preferred compounds are those of the hydroxyethyl cellulose type as exemplified by the Natrosol range of the Hercules Powder Company (NATROSOL is a Trade Mark).

The aqueous pigment dispersion may be one obtained directly from an aqueous preparation, for example, an azo coupling. Alternatively, the dispersion may be a redispersed pigment powder. In any of these cases the rosin acid or a salt thereof may be present during the preparation of the aqueous pigment dispersion. Alkali metal rosinates can be used to aid the dispersion of a presscake or powder into water. In the dispersion the pigment concentration is preferably at about 5% w/w in water.

Suitable pigments include azo, azo metal salts, azomethine, azomethine metal complexes, anthraquinone, phthalocyanine, nitro, perinone, perylene, dioxazine, thioindigo, isoindolinone or quinacridone pigments.

The amounts of the various components may vary over a wide range. The amount of pigment may be from 40–75%, preferably from 50–60% by weight. The amount of rosin acid may be from 5–25%, preferably from 10–25% and more preferably from 10–20% by weight. The amount of sorbitan ester may be from 5–40%, preferably from 10–20% by weight. If high amounts of sorbitan esters are used then it is preferable to use the solid esters, especially sorbitan tristearate. The amount of carrier may be from 5–50%, preferably from 20–30% by weight.

The process of the invention may be carried out in various ways, and the pigment dispersion may be contacted with the organic carrier and sorbitan ester before or after heating.

The rosin acid may be dissolved separately and then added to the pigment dispersion, or it may be dissolved in the presence of the pigment dispersion, using the appropriate amount of alkali in each case. The rosin is preferably added to the pigment dispersion before the other components. It is especially preferred that the pigment and rosin are contacted under alkaline conditions before the pigment and organic carrier are contacted at a temperature above the melting point of the organic carrier. The sorbitan ester, (which may be a liquid or a solid at ambient temperature) and the organic carrier may be initially contacted with the pigment dispersion at a temperature above or below their melting points.

The pH may be lowered to below 8 at any time after the pigment and rosin derivative have been contacted at a pH of 8–11. Preferably the rosin derivative and pigment are kept at a pH of 8–11 for at least 10 minutes before lowering the pH to below 8. The pH may be lowered at any time from when cold and before the addition of the other components to when hot and all the other components have been added. Preferably the pH is lowered at a temperature above the melting point of the sorbitan ester but before the addition of the organic carrier.

If a protective colloid is used it may be added at any stage, but it is preferably added before the carrier and pigment are contacted at a temperature above the melting point of the carrier. It is further preferred that the protective colloid is added after addition of the rosin acid derivative to the pigment dispersion but before the sorbitan ester or carrier have been added.

If desired, a soluble salt of a metal of Group II or III of the Periodic Table may be added before or after the pH has been lowered. The addition of the metal salt assists in the production of granules at higher pH values.

The particle size of the resulting granules may be up to 5 mm diameter or larger, but is preferably from 0.1 to 2 mm diameter. The particle size can be controlled by varying the stirring rate of the mixture—more violent agitation gives faster formation of smaller granules.

Typical stirrer types are those known as paddle, propeller, gate or bar stirrers. Important features of the stirring are the rate of stirring, velocity of the outer edge (tip velocity) and the degree of turbulence; the latter can also be influenced by the insertion of suitable baffles in the vessel.

High energy mixers of the mixer/emulsifier type such as those based on fast rotor blades in a shear head—e.g. as manufactured by Silverson Machines Ltd., Bucks., England, can be used under certain circumstances: the gap between rotor blades and shear head must be sufficient, at least 1–2 mm. and any holes in the shear head should be $\geq 1$ mm: this avoids smearing and build-up of the composition into a mass at the head. Such suitably modified heads produce excellent granules of small diameters—less than 0.5 mm. even in the absence of a protective colloid. Such mixers are most efficient in achieving good rates of conversion at the higher % pigment compositions; they are also very effective in producing good yields of granules with the azo metal salts which give poor conversion to granules with less turbulent stirring.

The free flowing nature of the products may be further enhanced by the addition of a small %—up to 2%—of a finely divided silica or silicate; the finely divided silicas are preferred, especially the organic surface modified silicas, e.g. Aerosil R.972 ex Degussa. Such organic modified silicas are readily mixed with the granules after drying by simple shaking or tumbling. The addition of such silicas especially improves the products to storage under compaction and at temperatures above ambient.

The products of the present invention can be used in most areas for application of pigments, for example, in colouring plastics, inks, paints etc. They are particularly suitable for pigmenting PVC, and of special interest for use in PVC is the combination of sorbitan tristearate and dicyclohexyl phthalate.

The invention is illustrated by the following Examples in which parts are parts by weight. In Examples 1–40 paddle type stirrers were used, whereas in subsequent examples the modified mixer/emulsifier type of stirrer was used.

EXAMPLE 1

To 50 parts of C.I. Pigment Yellow 13 as prepared by a conventional aqueous azo coupling was added sufficient potassium hydroxide to raise the pH to 9, and then a solution of 10 parts of Staybelite resin as its potassium salt was added. The pH of the resulting mixture was 10. 10 parts of sorbitan tristearate powder and 0.2 part hydroxyethyl cellulose (Natrosol 250 H R) were then added and the mixture was stirred and heated to 85° C. The pH was then lowered to 5 by adding 2 N hydrochloric acid and thereafter 30 parts of dicyclohexyl phthalate were added. The mixture was stirred for 2 hours at 85° C. and the resulting granules were all recovered by filtration on a 100 mesh (B.S.) sieve, washed with water to remove inorganic salts and dried at 50° C. This product of size distribution between 0.5 mm and 1.5 mm diameter could be readily dispersed into a plasticised P.V.C. compound.

Comparative Examples 1A and 1B

The procedure followed in Example 1 was repeated with the variations indicated in Table 1.

Table 1

|  | Pigment | Hydrogenated Wood Rosin | Sorbitan Tristearate | Dicyclohexyl phthalate |
|---|---|---|---|---|
| Example 1 | 50 | 10 | 10 | 30 |
| Example 1A | 50 | 10 | — | 40 |
| Example 1B | 50 | 2.5 | 10 | 37.5 |

The products obtained from Examples 1A and 1B had inferior dispersion in P.V.C. compared to products prepared as Example 1.

The size distribution of the resulting granules in Example 1A was extremely wide with up to 30% passing through the 100 mesh sieve at filtration and consequently the recovery of product was low.

EXAMPLES 2–11

The procedure following in Example 1 was repeated, except that the dicyclohexyl phthalate was replaced by the carriers indicated in Table II. Granule size and properties were similar to Example 1.

Table II

| Example 2 | 10% hydrogenated wood rosin* |
|  | 90% hydrogenated tallow amide |
| Example 3 | 50% hydrogenated wood rosin |
|  | 50% hydrogenated tallow amide |
| Example 4 | 80% hydrogenated wood rosin |
|  | 20% hydrogenated tallow amide |
| Example 5 | fatty ester (Cithrol CSP ex Croda Chemicals) |
| Example 6 | Neopentyl glycol dibenzoate |
| Example 7 | Glyceryl tristearate |
| Example 8 | Ester (Voidox ex Guardian Chemical Corp.) |
| Example 9 | Oleamide (Crodamide O ex Croda Chemicals) |
| Example 10 | Stearic Acid |
| Example 11 | Triphenyl phosphate |

*In each case the hydrogenated wood rosin and the hydrogenated tallow amide were melted together and then solidified before addition.

EXAMPLES 12–14

The procedure followed in Example 1 was repeated, except that oleamide was used in place of the dicyclohexyl phthalate and the parts used were as shown in Table III. Granule diameters were between 0.5–2.5 mm. The products could be dispersed into lithographic ink medium.

Table III

| Example | Pigment | Hydrogenated Wood Rosin | Sorbitan tristearate | Oleamide |
|---|---|---|---|---|
| 12 | 50 | 10 | 10 | 7 |
| 13 | 50 | 10 | 5 | 12 |
| 14 | 50 | 5 | 10 | 12 |

EXAMPLES 15–17

The procedure followed in Example 9 was repeated, except that the sorbitan tristearate was replaced with different sorbitan fatty acid esters, as shown in Table IV. Granule diameter was similar to that obtained in Example 1; the products could be dispersed into a plasticised PVC compound.

Table IV

| Example 15 | Sorbitan monolaurate |
| Example 16 | Sorbitan monostearate |
| Example 17 | Sorbitan mono-oleate |

EXAMPLE 18

The procedure of Example 1 was repeated, except that the slurry of C.I. Pigment Yellow 13 was replaced by a slurry of C.I. Pigment Yellow 17. Similar results were obtained.

EXAMPLE 19

The procedure of Example 1 was repeated, except that the slurry of C.I. Pigment Yellow 13 was replaced by a slurry of C.I. Pigment Yellow 83. Similar results were obtained.

EXAMPLE 20

To 50 parts C.I. Pigment Yellow 93 in the form of a 25% w/w aqueous presscake was added 600 parts water and the mixture stirred to homogenise, then a solution of 10 parts of Staybelite resin as its potassium salt added. The resultant pH of the mixture was 9.5 10 parts sorbitan tristearate powder and 0.5 parts hydroxy ethyl cellulose powder (Natrosol 250MR) were added and the mixture stirred and the temperature raised to 85° C. The pH was adjusted to 5 with 2 N hydrochloric acid and 30 parts of dicyclohexyl phthalate were added. The mixture was stirred for 2 hours at 85° C. and the resultant granules recovered by filtration on a 100 mesh sieve washed with water to remove inorganic salts and dried at 50° C. Granules of 0.2 mm–1 mm diameter were produced; these could be readily dispersed into a plasticised PVC compound.

EXAMPLE 21

The procedure followed in Example 20 was repeated, except that the ammonium salt of Staybelite Resin was used instead of the potassium salt. The product was similar in appearance, but dispersibility into the plasticised PVC was slightly superior to Example 20.

EXAMPLE 22

The procedure followed in Example 20 was repeated, except that the morpholine salt of Staybelite Resin was used instead of the potassium salt. The product appearance and performance were as Example 21.

EXAMPLE 23

The procedure followed in Example 20 was repeated, except that C.I. Pigment Red 144 was used instead of C.I. Pigment Yellow 93. The hydroxyethyl cellulose was reduced to 0.2 parts. A product of granule diameters 0.2 mm–0.8 mm diameter was obtained; dispersion into plasticised PVC was readily achieved.

EXAMPLE 24

To 50 parts C.I. Pigment Green 7 in the form of a 25% w/w aqueous presscake was added 600 parts water and the mixture stirred to homogenise, then a solution of 7.5 parts Staybelite Resin as its potassium salt added. The resultant pH of the mixture was 9.5. 7.5 parts of sorbitan tristearate powder, 0.5 parts hydroxyethyl cellulose powder (Natrosol 250HR) were added and the mixture stirred and the temperature raised to 85° C. The pH was adjusted to 5 with 2 N hydrochloric acid and 25 parts dicyclohexyl phthalate added. The mixture was stirred for 2 hours at 85° C. and the resultant granules recovered by filtration on a 100 mesh sieve, washed with water to remove inorganic salts and dried at 50° C. Granules of 0.5-2 mm diameter were obtained: these could be readily incorporated into an alcohol solvent nitrocellulose binder liquid packaging ink.

EXAMPLE 25

To 50 parts C.I. Pigment Blue 15.1 in the form of a 25% w/w aqueous presscake was added 600 parts water and the mixture stirred to homogenise, then a solution of 7,5 parts Staybelite Resin as its potassium salt added. The resultant pH of the mixture was 9.5. 15 parts of sorbitan tristearate powder, 0.5 parts hydroxyethyl cellulose powder (Natrosol 250MR) were added and the mixture stirred and the temperature raised to 85° C. The pH was adjusted to 5 with 2 N hydrochloric acid and 18.75 parts Stearic acid, and 18.75 parts dicyclohexyl phthalate added. The mixture was stirred for 2 hours at 85° C. and the resultant granules recovered by filtration on a 100 mesh sieve, washed with water to remove inorganic salts and dried at 50° C. The product of granule size range 0.5 mm-1 mm diameter could be readily dispersed into plasticised PVC and rigid PVC compounds.

EXAMPLE 26

The procedure followed in Example 25 was repeated except that the stearic acid was replaced with dicyclohexyl phthalate. Similar results were obtained.

EXAMPLE 27

The procedure followed in Example 26 was repeated except the C.I. Pigment Blue 15.3 was used in place of C.I. Pigment Blue 15.1. The granules of 1.5 mm-2 mm diameter could be dispered into lithographic ink medium.

EXAMPLE 28

To 50 parts C.I. Pigment Orange 34 as prepared by a conventional aqueous azo coupling was added sufficient potassium hydroxide to raise the pH to 9, and then a solution of 8 parts of Staybelite Resin as its potassium salt was added. The pH of the resulting mixture was 9.5. 10 parts of sorbitan tristearate powder and 0.5 parts hydroxy ethyl cellulose (Natrosol 250HR) were then added and the mixture stirred and heated to 85° C. The pH was then lowered to 5 by adding 2 N hydrochloric acid and thereafter 32 parts of dicyclohexyl phthalate were added. The mixture was stirred for 2 hrs. at 85° C. and the resulting granules were recovered by filtration on a 100 mesh sieve, washed with water to remove inorganic salts and dried at 40° C. These granules of diameter 0.5 mm-2.5 mm diameter could be readily dispersed into a plasticised PVC compound.

EXAMPLE 29

The procedure of Example 28 was repeated except that the 32 parts dicyclohexyl phthalate were replaced by a mixture of 16 parts stearic acid and 16 parts dicyclohexyl phthalate. The resultant granules of 0.5 mm-1.5 mm diameter showed excellent dispersibility into a rigid PVC compound.

EXAMPLE 30

18 parts of a presscake of C.I. Pigment Red 166 were dispersed into 250 parts of water. 0.27 parts hydroxyethyl cellulose, 2.4 parts Staybelite resin (as a 10% parts by weight aqueous solution of its potassium salt) and 2.4 parts sorbitan tristearate were added and the mixture heated with stirring to 85° C. The mixture was then adjusted to pH 5 and 7.2 parts dicyclohexyl phthalate added. Stirring was continued for 4 hours at 85° C. The product was then isolated on a 60 mesh B.S. sieve, and dried at 50° C.; the granule at 60% parts by weight pigment could be readily incorporated into a plasticised P.V.C. compound. At the isolation stage 90% of the input material (pigment, resin, sorbitan ester, and dicyclohexyl phthalate) was retained on the above 60 mesh sieve whilst 10% passed through during isolation and washing; this 10% was retained on a fine filter and returned to a granule preparation as above at a known input of pigment and organic compounds.

EXAMPLES 31-32

The procedure of Example 20 was followed exactly except that the hydroxyethyl cellulose was replaced by 0.75 part (Example 31) and 3.75 parts (Example 32) of a polyoxyethylene oxypropylene monostearate (G.2162 ex Honeywell Atlas). The product was granules of a generally spherical nature of size range shown 1-5 mm for Example 31 and 0.5-2 mm for Example 32.

EXAMPLE 33

The procedure of Example 1 was repeated except that on reaching 85° C. the pH was adjusted to 8 instead of 5 and then a solution of 7.5 parts of calcium chloride dihydrate in 50 parts water was added. The temperature and stirring were maintained and 12 parts of dicyclohexyl phthalate added. Granules similar to Example 1 were obtained.

EXAMPLE 34

The procedure of Example 31 was repeated except that the pH was adjusted to 7 and a solution of 6 parts of zinc chloride in 50 parts of water was added. A product similar to Example 31 was obtained.

EXAMPLES 35-40

The procedure of Example 1 was followed except that the hydroxyethyl cellulose was replaced by the listed non-ionic agent at the given amount.

| Example | Non-ionic Agent | Parts |
|---|---|---|
| 35 | poly(oxypropylene-oxyethylene)[1] | 1.25 |
| 36 | poly(oxypropylene-oxyethylene)[1] | 2.50 |
| 37 | poly(oxypropylene-oxyethylene)[2] | 1.25 |
| 38 | ethoxylated nonyl phenol[3] | 1.25 |
| 39 | ethoxylated fatty alcohol[4] | 2.50 |
| 40 | ethoxylated fatty alcohol[5] | 2.50 |

[1]Supronic E. 400 ex Allied Colloids Ltd.
[2]Supronic E. 800 ex Allied Colloids Ltd.
[3]Synperonic NP. 9 ex I.C.I Ltd.
[4]Synperonic A. 9 ex I.C.I. Ltd.
[5]Synperonic A. 20 ex I.C.I. Ltd.

EXAMPLE 41

To 50 parts of C.I. Pigment Yellow 13 as prepared in a conventional aqueous azo coupling was added sufficient ammonia to give a pH of 8.5 and then a solution of 7.1 parts of Staybelite resin as its ammonium salt was added. The pH of the resultant mixture was 9.5. 8.9 parts sorbitan tristearate powder was then added and the mixture stirred using a modified mixer/emulsifier of the type described in the text, and heated to 75° C. The pH was then lowered to 5 by adding 5 N hydrochloric acid and thereafter 28.3 parts of dicyclohexyl phthalate was added. The mixture was stirred for 15 min. at 75° C., and the resulting granules were recovered by filtration on a 200 mesh (B.S.) sieve, washed with water to remove inorganic salts and dried at 50° C. The resulting non-dusting granules of 0.1–0.5 mm diameter could be readily dispersed into a plasticised P.V.C. compound.

EXAMPLE 42

To 50 parts dry weight of C.I. Pigment Yellow 93 presscake was added 600 parts water and the mixture stirred to homogenise, then a solution of 10 parts of Staybelite resin as its ammonium salt added. The resultant pH of the mixture was 9.5. 10 parts Sorbitan tristearate powder was then added and the mixture stirred using a modified mixer/emulsifier of the type described in the text, and heated to 85° C. The pH was then lowered to 5.0 by adding 5 N hydrochloric acid and thereafter 30 parts of dicyclohexyl phthalate was added. The mixture was stirred for 5 min. at 85° C. and the resulting granules were recovered by filtration on a 200 mesh (B.S.) sieve, washed with water to remove inorganic salts and dried at 50° C. The product appearance and properties were similar to those of Example 41.

EXAMPLE 43

To 50 parts dry weight of C.I. Pigment Red 144 was added 1000 parts water and the mixture stirred for 30 mins., then added 8 parts of Staybelite resin as its ammonium salt. The resultant pH of the mixture was 9.5. 10 parts Sorbitan tristearate powder and 0.1 parts hydroxyethyl cellulose were then added and the mixture stirred using a modified mixer/emulsifier of the type described in the text and heated to 90° C., then held for 5 mins. The pH was then lowered to 5.0 by adding 5 N acetic acid and thereafter 32 parts of dicyclohexyl phthalate were added. The mixture was stirred for 5 mins. at 90° C. and the resulting granules were recovered by filtration on a 200 mesh (B.S.) sieve, washed with water to remove inorganic salts and dried at 50° C. The product was fine granules of 0.1–0.5 mm diameter and was easily dispersed into a plasticised P.V.C. compound. Addition of 1% parts by weight of an organic surface treated silica—Aerosil R.972 (ex. Degussa) improved the free flowing nature of the granules and especially improved these properties to any change on storage.

EXAMPLE 44

To 50 parts dry weight of C.I. Pigment Green 7 presscake was added 2500 parts water and the mixture stirred for 30 mins. Then a solution of 7.5 parts of Staybelite resin as its potassium salt added and the mixture stirred for 2 hours using a modified mixer/emulsifier of the type described in the text, the resultant pH of the mixture was 9.5. 7.5 parts sorbitan tristearate and 0.5 parts hydroxyethyl cellulose were added and it was heated to 85° C. The pH was then lowered to 5.0 by adding 5 N hydrochloric acid and thereafter 35 parts of dicyclohexyl phthalate was added. The mixture was stirred for 1 min. at 85° C. and the resulting granules were recovered by filtration on a 200 mesh (B.S.) sieve, washed with water to remove inorganic salts and dried at 50° C. The granules of 0.1–0.5 mm diameter were easily dispersed into a plasticised P.V.C. compound.

EXAMPLE 45

The procedure in Example 44 was repeated increasing the Staybelite to 10 parts and reducing the dicyclohexyl phthalate to 5 parts. The fine non-dusting product could be readily dispersed into a plasticised P.V.C. compound.

EXAMPLES 46–51

The procedure in Example 41 was repeated except that the ammonium salt of Staybelite resin was replaced by the potassium salt of resins indicated in the table. Granule size and properties were similar to Example 41.

| | | Resin | | |
|---|---|---|---|---|
| Example | Trade Name | Type | Acid Value | Supplier |
| 46 | Burez 421 | Disproportionated | 173 | Tenneco Malros |
| 47 | Pentalyn 255 | Maleic condensate | 210 | Hercules Powder Co. |
| 48 | Ennesin A.100 | Phenolic | 100 | Leon Frenkel Ltd. |
| 49 | Ennesin M.57W | Phenolic | 120 | Leon Frenkel Ltd. |
| 50 | Albertol RP.692 | Maleic condensate | 115 | Resinous Chemicals Ltd. |
| 51 | Kelrez 42-402 | Phenolic | 135 | Croda Chemicals |

EXAMPLES 52–53

The procedure in Example 42 was repeated except that the ammonium salt of Staybelite resin was replaced by the potassium salt of the resins indicated in the table. Granule size and properties were similar to Example 42

| Example | Resin |
|---|---|
| 52 | Albertol KP.692 |
| 53 | Kelrez 42-402 |

EXAMPLES 54–55

The procedure of Examples 52 and 53 were repeated except that the resin as increased to 15 parts and the dicyclohexyl phthalate reduced to 25 parts. Similar products were obtained.

| Example | Resin |
|---|---|
| 54 | Albertol KP.692 |
| 55 | Kelrez 42-402 |

EXAMPLE 56

To 50 parts of C.I. Pigment Yellow 17 as prepared in a conventional aqueous azo coupling was added sufficient potassium hydroxide to raise the pH to 7.5 and then a solution of 10 parts of Kelrez 42-402 as its potassium salt was added. The pH of the resultant mixture was 10. 10 parts of Sorbitan tristearate powder was then added and the mixture stirred using a modified mixer/emulsifier of the type described in the text and heated to 70° C. The pH was then lowered to 5 by adding 5 N hydrochloric acid and thereafter 30 parts of dicyclohexyl phthalate was added. The mixture was stirred for 5 mins. at 70° C. and the resulting granules were recovered by filtration on a 200 mesh (B.S.) sieve, washed with water to remove inorganic salts and dried at 40° C. The resulting non-dusting granules of 0.1–0.5 mm diameter could be readily dispersed into a P.V.C. compound.

EXAMPLE 57

The procedure in Example 54 was repeated except that C.I. Pigment Yellow 83 was used instead of C.I. Pigment Yellow 17. A product of granule diameters 0.1–0.5 mm diameter was obtained; dispersion into a plasticised P.V.C. compound was readily achieved.

EXAMPLE 58

The procedure of Example 28 was followed except that the Staybelite resin was added as a solution of its ammonium salt and stirring was by the modified mixer/emulsifier. Granules of 0.1–0.5 mm diameter were produced, these could be easily dispersed into a plasticised P.V.C. compound. 1% by weight of a finely divided silica (Cabosil M.5) was tumbled with the above granules: this treatment improved their free-flowing properties. When samples of the silica treated and untreated granules were stored at 50° C. for 5 days the untreated product showed a greater tendency to produce aggregates of granules; on cooling to ambient 18°–20° C. the silica treated product was as free-flowing as before storage whereas the untreated product required several days to recover its properties.

Example 59

To 50 parts of C.I. Pigment Yellow 62 as a 3% parts by weight aqueous slurry, prepared by conventional coupling and addition of calcium chloride, 12.5 parts sorbitan tristearate was added and the temperature raised to 85° C. while stirring with the modified mixer/emulsifier. The temperature was maintained at 85° C. for 30 mins. and 37.5 parts of dicyclohexyl phthalate was added. Stirring was continued for a further 30 mins. before isolation of the granules of 0.1–0.5 mm diameter on a 200 mesh (B.S.) sieve, washing and drying at 50° C. This product was readily dispersed into a plasticised P.V.C. compound or a low density polyethylene compound.

EXAMPLE 60

A pigment composition consisting of 86 parts C.I. Pigment 48 (calcium salt) and 14 parts Staybelite resin, prepared by a conventional coupling process in the presence of the resin to give a 3.3% parts by weight aqueous slurry of this composition, was stirred on the modified mixer/emulsifier with 1 part Natrosol 250MR and 25 parts sorbitan tristearate. The mixture was then heated to 85° C. and 75 parts dicyclohexyl phthalate added; the stirring was continued for 3 minutes and the product isolated by sieving etc. as for Example 59. The resultant granules of 0.1–0.5 mm diameter were readily dispersed into a plasticised P.V.C. composition.

What we claim is:

1. A process for the production of a pigment composition in a non-dusting form which comprises contacting an aqueous dispersion of an organic pigment with
   (a) a solution or dispersion of an alkaline soluble rosin acid derivative having an approximate acid value in the range 100–250 at a pH of from 8 to 11
   (b) a sorbitan ester, and
   (c) a water-insoluble organic carrier having a melting point below 100° C. at a temperature above the melting point of both the sorbitan ester and the organic carrier, reducing th pH to below 8, stirring the composition until the pigment, rosin derivative, sorbitan ester and organic carrier are associated in generally spherical granules, and recovering the resulting granules, the amounts of ingredients being 40–75% pigment, 5–25% rosin acid, 5–40% sorbitan ester and 5–50% carrier, all percentages being based on the weight of the total composition.

2. A process as claimed in claim 1, in which the rosin acid derivative is based on wood rosin or its hydrogenated derivative or disproportionated rosin.

3. A process as claimed in claim 1, in which the sorbitan ester is derived from a fatty acid having 12 to 22 carbon atoms.

4. A process as claimed in claim 1, in which the organic carrier is a single compound or a mixture of compounds which give a mixed melting point below 100° C.

5. A process as claimed in claim 1, in which a protective colloid is added to the mixture.

6. A process as claimed in claim 1, in which the amount of pigment is from 50–60% by weight of the total composition.

7. A process as claimed in claim 1, in which the amount of sorbitan ester is from 10 to 20% by weight of the total composition.

8. A process as claimed in claim 1, in which the amount of organic carrier is from 20 to 30% by weight of the total composition.

9. A process as claimed in claim 1, in which up to 2% by weight of a finely divided silica or silicate is added to the mixture.

* * * * *